3,723,316
STABILIZATION OF ORGANIC SUBSTANCES
Stephen N. Massie, Palatine, Ill., assignor to Universal
  Oil Products Company, Des Plaines, Ill.
No Drawing. Filed Nov. 9, 1970, Ser. No. 88,097
    Int. Cl. C10l 1/22; C10m 1/32
U.S. Cl. 252—50                               4 Claims

ABSTRACT OF THE DISCLOSURE

Organic substances normally subject to oxidative deterioration containing, as an inhibitor against said deterioration, a stabilizing concentration of an alpha, beta-unsaturated polynitrile.

BACKGROUND OF THE INVENTION

Practically all organic substances undergo deterioration due to oxidation. The organic substances may be of mineral, animal, marine or vegetable origin or the organic substance may be synthetically prepared.

As illustrative of petroleum distillates, gasoline undergoes oxidative deterioration during transportation and storage, with the resultant gum formation, discoloration and other adverse reactions. When tetraethyl lead or other additives are incorporated in the gasoline, the oxidative reaction products may undergo chemical reaction with the additives and reduce the effectiveness of the additives for the intended purpose. Other petroleum distillates which undergo oxidative deterioration include kerosene, diesel oil, jet fuel, fuel oil, lubricating oil, etc.

Animal and vegetable oils similarly undergo oxidative deterioration, which may cause rancidity thereof. The animal and vegetable oils are used in many applications other than as foods and oxidative deterioration of the oils results in sediment formation, discoloration and in the formation of other undesired reaction products.

The need for an antioxidant also occurs in the handling of olefinic or other unsaturated compounds prior to further processing. For example, ethylene, propylene, styrene, etc. are transported and stored prior to subsequent polymerization, condensation or other desired reactions. During such transportation and storage, the unsaturated compounds may undergo premature polymerization or other condensation reactions. Such premature polymerization may be avoided by incorporating an antioxidant during such transportation and storage.

DESCRIPTION OF THE INVENTION

In accordance with the present invention, undesired oxidation is inhibited by incorporating an alpha, beta-unsaturated polynitrile in the organic substance.

In one embodiment the present invention relates to an organic substance normally subject to oxidative deterioration containing, as an inhibitor against said deterioration, a stabilizing concentration of an alpha, beta-unsaturated polynitrile.

Illustrative examples or organic substances which undergo oxidative deterioration have been set forth hereinbefore. It is understood that the present invention may be utilized for inhibiting oxidative deterioration of any organic substance which undergoes such deterioration.

The alpha, beta-unsaturated nitrile for use in the present invention may be illustrated by the following formula:

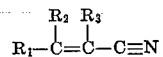

where $R_1$, $R_2$ and $R_3$ are independently selected from hydrogen, alkyl, cyano and cyanoalkyl, at least one being cyano or cyanoalkyl. In a preferred embodiment the alkyl groups contain from 1 to 10 carbon atoms each.

A particularly preferred nitrile for use in the present invention is tetracyanoethylene. Referring to the above formula, $R_1$, $R_2$ and $R_3$ are cyano groups. Other tetracyano compounds include 1,1,3,3-tetracyano-1-propene,
1,1,4,4-tetracyano-1-butene,
1,1,5,5-tetracyano-1-pentene,
1,1,6,6-tetracyano-1-hexene,
1,1,3,3-tetracyano-2-methyl-1-propene,
1,1,4,4-tetracyano-3-methyl-1-butene,
1,1,5,5-tetracyano-3,4-dimethyl-1-pentene, etc.

Illustrative compounds containing three cyano groups include tricyanoethylene,
1,1,2-tricyano-1-propene,
1,1,3-tricyano-1-propene,
1,1,2-tricyano-1-butene,
1,1,4-tricyano-1-butene,
1,1,2-tricyano-1-pentene,
1,1,5-tricyano-1-pentene,
1,1,4-tricyano-2-methyl-1-butene,
1,1,4-tricyano-3-ethyl-1-butene,
1,1,2-tricyano-1-decene, etc.

Illustrative dicyano compounds include 1,1-dicyanoethylene,
1,2-dicyanoethylene (cis and trans),
1,1-dicyano-1-propene,
1,2-dicyano-1-propene,
1,3-dicyano-1-propene,
1,1-dicyano-1-butene,
1,2-dicyano-1-butene,
1,4-dicyano-1-butene,
1,1-dicyano-1-pentene,
1,2-dicyano-1-pentene,
1,5-dicyano-1-pentene,
1,1-dicyano-1-hexene,
1,6-dicyano-1-hexene,
5,6-dicyano-5-decene,
8,9-dicyano-8-hexadecene,
10,11-dicyano-10-eicosene, etc., as well as dicyano compounds containing branching in the aliphatic chain.

It is understood that the different alpha, beta-unsaturated polynitriles are not necessarily equivalent in their antioxidizing effectiveness in the same or different substrate. Accordingly, the alpha, beta-unsaturated polynitrile will be selected with reference to the particular substrate in which it is to be used.

The alpha, beta-unsaturated polynitrile is added to the organic substance in a stabilizing concentration, which will depend upon the particular organic substance. In general, the stabilizing concentration is from about 0.001% to about 1% and preferably from about 0.005% to about 0.1% by weight. The inhibitor is incorporated in the organic substance in any suitable manner and generally accompanied by some form of mixing in order to obtain uniform distribution of the inhibitor in the organic substance. While the inhibitor may be added as such, it generally is preferable, for ease of handling and measuring, to prepare a stock solution of the inhibitor in a suitable solvent. Any suitable solvent may be employed which will depend upon the particular organic substance in which the inhibitor is to be used. The solvent may be selected from hydrocarbons and particularly aromatic hydrocarbons such as benzene, toluene, xylene, ethylbenzene, cumene, etc. or paraffinic hydrocarbons such as hexane, heptane, octane, nonane, decane, etc., particularly when used in a hydrocarbon substance. Other solvents include alcohol, such as methanol, ethanol, propanol, butanol, etc., ketones such as acetone, methyl ethyl ketone, methyl propyl ketone, diethyl ketone, etc.

As hereinbefore set forth, the alpha, beta-unsaturated polynitrile may be used to stabilize any organic substance normally subject to oxidative deterioration. In one embodiment, the organic substance is a hydrocarbon oil including gasoline, naphtha, kerosene, jet fuel, diesel oil, fuel oil, lubricating oil, etc. In another embodiment the organic substance to be stabilized is of animal, marine or vegetable origin and includes, for example, lard, tallow, palm oil, olive oil, peanut oil, rape seed oil, whale blubber, etc. and particularly these oils and fats being used for special applications such as lubricants and not as food. In still another embodiment, the inhibitor is used in synthetically prepared compounds or compositions such as the dioctyl sebacate or other dialkyl esters being used as synthetic lubricating oils. In another embodiment the organic substance is grease which is prepared by adding a suitable thickening agent to mineral or synthetic lubricating oil. As hereinbefore set forth, still another embodiment includes the stabilization of monoolefins such as ethylene, propylene, butylene, etc., or arylolefins, such as styrene, during transportation and storage prior to polymerization or other condensation. In still another method the inhibitor may be used during the fractionation of unstable compounds to minimize undesired reactions.

In still another embodiment the present invention is used for the stabilization of plastics and resins which may be broadly classified as solid polymers. These solid polymers are attacked by oxygen, with resultant degradation of the polymer. In one embodiment the solid polymer is a polyolefin including polyethylene, polypropylene, polybutylene, mixed polymers thereof, including terpolymers. Other solid polymers are referred to as polystyrene, polyester, polycarbonate, polyurethane, polyether, epoxy resins, etc. In still another embodiment, the organic substance is rubber which may be of natural origin or synthetically prepared. The rubbers generically are defined as comprising a rubbery polymer of a conjugated 1,3-diene. Synthetic rubbers include SBR (butadienestyrene), butyl rubber (butadiene-isobutylene), neoprene, etc. The natural rubbers include Hevea rubber, caoutchouc, balata, gutta-percha, etc.

It is understood that the antioxidant of the present invention may be used along with other additives normally incorporated in the organic substance. For example, it is general practice to incorporate in gasoline one or more of de-icer, metal deactivator, detergent, combustion improver, dye, antioxidant, etc. When desired, another antioxidant also may be used in addition to the antioxidant of the present also may be used in addition to the antioxidant of the present invention. As another example, rubber formulations include one or more of antiozonants, antioxidants, accelerators, retarders, etc., as well as wax and/or oil.

The following examples are introduced to illustrate further the novelty and utility of the present invention but not with the intention of unduly limiting the same.

EXAMPLE I

This example illustrates the use of tetracyanoethylene as an oxidation inhibitor. These evaluations were made in the oxidation of toluene. About 2.5 mols of toluene were used per mol of oxygen charged in the form of air. In the blank or control run, 60 g. of toluene were charged to a rotating autoclave of 850 ml. nominal capacity, the autoclave sealed, pressurized with 525 p.s.i.g. of air (280 millimols available oxygen) and heated to 180° C. for 16 hours. In another run, 1 g. of tetracyanoethylene was charged along with the toluene.

In the blank or control run there were produced 93 and 39 millimols per mol of oxygen charged, respectively, of benzoic acid and benzaldehyde. In the run in which the tetracyanoethylene was present there were produced only 4 and 10 millimols per mol of oxygen charged, respectively, of benzoic acid and benzaldehyde.

The above data demonstrate that, even under the severe conditions of 180° C. and 525 p.s.i.g. of air, tetracyanoethylene served to inhibit the oxidation of toluene.

EXAMPLE II

This example illustrates the use of tetracyanoethylene as an oxidation inhibitor in cracked gasoline. The gasoline has a boiling range of from about 27° to about 210° C. and contains unsaturated compounds. Upon exposure to air, the gasoline tends to form gum and undergo discoloration. To stabilize the gasoline against such deterioration, 0.005% by weight of tetracyanoethylene is incorporated in the gasoline, and the gasoline is transported and stored in conventional manner.

EXAMPLE III

This example illustrates the use of an inhibitor of the present invention in lithium grease. The grease is prepared by mixing 92% by weight of refined lubricating oil with 8% by weight of lithium stearate. The mixture is heated at about 230° C. with agitation. Subsequently the grease is cooled, while agitating, to 160° C. and at this temperature 0.5% by weight of 1,1-dicyano-1-decene is added, followed by further mixing and gradual cooling to room temperature.

The stability of the grease is tested according to a modified Norma-Hoffmann method, in which a sample of the grease is placed in a bomb and oxygen charged thereto. The bomb then is heated to 100° C. and the time required for a drop of 5 lbs. of pressure is taken as the induction period.

A control sample of the grease (not containing an additive) has an induction period of 9.5 hours. On the other hand, a sample of the grease containing 0.5% by weight of the 1,1-dicyano-1-decene does not reach the induction period for more than 25 hours.

EXAMPLE IV

This example illustrates the use of an inhibitor of the present invention in lard. The lard used in this example has a normal stability of 6 hours, as determined by the Swift Test. In general, this test comprises bubbling air through a sample of the lard and determining rancidity organolepically and by peroxide number. The results of this test are reported as A.O.M. stability period, which is the number of hours required to reach a peroxide number of 20.

Another sample of the lard is prepared to contain 0.02% by weight of 1,2-dicyanoethylene (fumaronitrile) and this serves to extend the stability period of the lard to more than 15 hours.

I claim as my invention:

1. Organic substance normally subject to oxidative deterioration and selected from the group consisting of petroleum distillate oils, animal and vegetable fats and oils, and organic polymers seected from the group consisting of polyolefin, polystyrene, polyester, polycarbonate, polyurethane, polyether and epoxy resin, said organic substance containing, as an inhibitor against said deterioration, a stabilizing concentration of tetracyanoethylene.

2. The organic substance of claim 1 being gasoline.

3. The organic substance of claim 1 being lubricating oil.

4. The organic substance of claim 1 being lard.

References Cited

UNITED STATES PATENTS

| | | | |
|---|---|---|---|
| 3,542,732 | 11/1970 | Austin et al. | 260—45.9 R |
| 3,223,631 | 12/1965 | Morway et al. | 252—50 X |
| 2,766,247 | 10/1956 | Middleton | 44—72 X |
| 2,053,045 | 9/1936 | Ralston et al. | 252—50 X |
| 2,882,232 | 4/1959 | Haines et al. | 252—50 |
| 1,856,186 | 5/1932 | Hofmann et al. | 252—50 |

PATRICK P. GARVIN, Primary Examiner

W. J. SHINE, Assistant Examiner

U.S. Cl. X.R.

44—72; 99—163, 164; 252—401, 405; 260—45.9 R, 465.8 R, 814